US009661126B2

(12) United States Patent
Hodges et al.

(10) Patent No.: US 9,661,126 B2
(45) Date of Patent: May 23, 2017

(54) DRIVING DISTRACTION REDUCTION SYSTEM AND METHOD

(71) Applicant: WaveMarket, Inc., Emeryville, CA (US)

(72) Inventors: Daniel Hodges, San Francisco, CA (US); Tasos Roumeliotis, Orinda, CA (US)

(73) Assignee: Location Labs, Inc., Emeryville, CA (US)

( * ) Notice: Subject to any disclaimer, the term of this patent is extended or adjusted under 35 U.S.C. 154(b) by 0 days.

(21) Appl. No.: 14/329,382

(22) Filed: Jul. 11, 2014

(65) Prior Publication Data
US 2016/0014262 A1    Jan. 14, 2016

(51) Int. Cl.
*H04M 3/00* (2006.01)
*H04M 1/725* (2006.01)
*H04W 4/02* (2009.01)

(52) U.S. Cl.
CPC ... *H04M 1/72577* (2013.01); *H04M 1/72552* (2013.01); *H04M 1/72569* (2013.01); *H04M 1/72572* (2013.01); *H04W 4/028* (2013.01)

(58) Field of Classification Search
CPC ......... H04M 1/72577; H04M 2250/12; H04W 4/046; H04W 4/001; H04W 84/005; H04W 4/027; B60R 11/0241; B60R 11/0264; B60Q 2300/42
USPC ........................................................ 455/419
See application file for complete search history.

(56) References Cited

U.S. PATENT DOCUMENTS

| | | | |
|---|---|---|---|
| 6,351,556 B1 | 2/2002 | Loui et al. |
| 6,690,940 B1 | 2/2004 | Brown et al. |
| 7,313,276 B2 | 12/2007 | Simelius et al. |
| 7,577,246 B2 | 8/2009 | Idan et al. |
| 7,689,465 B1 | 3/2010 | Shakes et al. |
| 7,705,726 B2 | 4/2010 | Graves et al. |
| 7,839,891 B1 | 11/2010 | Allan |
| 7,876,704 B1 | 1/2011 | Bims et al. |
| 7,945,470 B1 | 5/2011 | Cohen et al. |
| 8,024,290 B2 | 9/2011 | Yang et al. |
| 8,027,662 B1 | 9/2011 | Miller et al. |
| 8,095,175 B2 | 1/2012 | Todd et al. |
| 8,107,432 B2 | 1/2012 | Seo |
| 8,135,392 B2 | 3/2012 | Marcellino |
| 8,160,560 B2 | 4/2012 | Geyer et al. |

(Continued)

OTHER PUBLICATIONS

U.S. Appl. No. 14/062,888, filed Oct. 25, 2013.
U.S. Appl. No. 61/820,800, filed May 8, 2013 by Paul Zsebedics.

*Primary Examiner* — Timothy Pham
(74) *Attorney, Agent, or Firm* — Dovas Law, P.C.

(57) ABSTRACT

A processor-implemented system for automatically controlling the functionality of a mobile device of a driver while driving so as to reduce driving distractions related to the mobile device. The system detects driving and automatically enters a driving mode when driving is detected. The driving mode implements an alternate user interface (UI) that limits interactions with the mobile device in accord with predetermined restrictions. The driving mode can be configured to automatically screen incoming calls and texts while suppressing potentially-distracting notifications. The system implements a PIN-based mechanism that ensures user compliance while enabling an opt-out feature usable under controlled circumstances.

19 Claims, 5 Drawing Sheets

(56) References Cited

U.S. PATENT DOCUMENTS

| | | |
|---|---|---|
| 8,351,408 B2 | 1/2013 | Daigle |
| 8,594,065 B2 | 11/2013 | Polito et al. |
| 8,621,075 B2 | 12/2013 | Luna |
| 8,676,640 B2 | 3/2014 | O'Neill et al. |
| 8,738,688 B2 | 5/2014 | Myers et al. |
| 2001/0047286 A1 | 11/2001 | Walker et al. |
| 2002/0174180 A1 | 11/2002 | Brown et al. |
| 2003/0005306 A1 | 1/2003 | Hunt et al. |
| 2003/0027603 A1 | 2/2003 | Takasaki |
| 2004/0083472 A1 | 4/2004 | Rao et al. |
| 2004/0268381 A1 | 12/2004 | Simelius et al. |
| 2006/0085547 A1 | 4/2006 | Cormier |
| 2006/0136236 A1 | 6/2006 | Horton |
| 2006/0184792 A1 | 8/2006 | Berlin |
| 2006/0206895 A1 | 9/2006 | Gray et al. |
| 2007/0150567 A1* | 6/2007 | Lamparello ............ G06Q 10/00 709/223 |
| 2007/0208802 A1 | 9/2007 | Barman et al. |
| 2008/0246605 A1 | 10/2008 | Pfeffer et al. |
| 2008/0299954 A1 | 12/2008 | Wright et al. |
| 2009/0002147 A1 | 1/2009 | Bloebaum et al. |
| 2009/0247124 A1 | 10/2009 | De Atley et al. |
| 2010/0037088 A1 | 2/2010 | Krivopaltsev et al. |
| 2010/0113013 A1 | 5/2010 | Karabinis |
| 2010/0154024 A1 | 6/2010 | Boxmeyer et al. |
| 2010/0210254 A1 | 8/2010 | Kelly et al. |
| 2010/0216509 A1* | 8/2010 | Riemer ............ H04M 1/72577 455/557 |
| 2011/0029598 A1 | 2/2011 | Arnold et al. |
| 2011/0055546 A1 | 3/2011 | Klassen et al. |
| 2011/0093161 A1 | 4/2011 | Zhou et al. |
| 2011/0151830 A1 | 6/2011 | Blanda et al. |
| 2011/0231280 A1 | 9/2011 | Farah |
| 2011/0244837 A1 | 10/2011 | Murata et al. |
| 2011/0252375 A1 | 10/2011 | Chaudhri |
| 2011/0269452 A1 | 11/2011 | Roumeliotis et al. |
| 2011/0275321 A1 | 11/2011 | Zhou et al. |
| 2011/0294520 A1 | 12/2011 | Zhou et al. |
| 2012/0001548 A1 | 1/2012 | Recker et al. |
| 2012/0036220 A1 | 2/2012 | Dare et al. |
| 2012/0081500 A1 | 4/2012 | Border et al. |
| 2012/0142379 A1 | 6/2012 | Park |
| 2012/0151047 A1 | 6/2012 | Hodges et al. |
| 2012/0151384 A1 | 6/2012 | Stass et al. |
| 2012/0179767 A1 | 7/2012 | Clarke et al. |
| 2012/0188163 A1 | 7/2012 | Xiao |
| 2012/0192016 A1 | 7/2012 | Gotesdyner et al. |
| 2012/0195295 A1 | 8/2012 | Elmaleh |
| 2012/0223861 A1 | 9/2012 | Kupfer et al. |
| 2012/0244883 A1 | 9/2012 | Tibbitts et al. |
| 2012/0258740 A1 | 10/2012 | Mildh et al. |
| 2012/0260118 A1 | 10/2012 | Jiang et al. |
| 2012/0271908 A1 | 10/2012 | Luna et al. |
| 2012/0323990 A1 | 12/2012 | Hayworth |
| 2012/0330702 A1 | 12/2012 | Kowalski et al. |
| 2013/0040629 A1 | 2/2013 | Sprigg et al. |
| 2013/0047229 A1 | 2/2013 | Hoefel et al. |
| 2013/0111462 A1 | 5/2013 | Umansky et al. |
| 2013/0143512 A1 | 6/2013 | Hernandez et al. |
| 2013/0145007 A1 | 6/2013 | Randazzo et al. |
| 2013/0185411 A1 | 7/2013 | Martin |
| 2013/0198272 A1 | 8/2013 | Shionoya et al. |
| 2013/0198296 A1 | 8/2013 | Roy et al. |
| 2013/0303143 A1* | 11/2013 | Schrader ............ H04M 1/72577 455/418 |
| 2013/0316746 A1 | 11/2013 | Miller et al. |
| 2013/0332886 A1 | 12/2013 | Cranfill et al. |
| 2013/0339345 A1 | 12/2013 | Soto Matamala et al. |
| 2013/0346333 A1 | 12/2013 | Hassler et al. |
| 2014/0025465 A1 | 1/2014 | Herring et al. |
| 2014/0082065 A1 | 3/2014 | Anakata et al. |
| 2014/0108649 A1 | 4/2014 | Barton et al. |
| 2014/0148192 A1 | 5/2014 | Hodges et al. |
| 2014/0164037 A1 | 6/2014 | Rao et al. |
| 2014/0179261 A1* | 6/2014 | Riggs ................ H04M 1/72577 455/404.2 |
| 2014/0180438 A1 | 6/2014 | Hodges et al. |
| 2014/0187219 A1* | 7/2014 | Yang .................... H04W 4/046 455/418 |
| 2014/0258357 A1 | 9/2014 | Singh et al. |
| 2014/0310327 A1 | 10/2014 | Yip et al. |
| 2014/0310365 A1 | 10/2014 | Sample et al. |
| 2014/0337077 A1 | 11/2014 | Zsebedics et al. |
| 2014/0338006 A1 | 11/2014 | Grkov et al. |
| 2014/0364153 A1* | 12/2014 | Ren ....................... H04W 4/046 455/456.4 |
| 2014/0370857 A1* | 12/2014 | Bovis .................... H04W 4/16 455/414.1 |
| 2015/0120349 A1 | 4/2015 | Weiss |
| 2015/0163664 A1 | 6/2015 | Martin |
| 2015/0188777 A1 | 7/2015 | Frost |

\* cited by examiner

DRIVING DISTRACTION REDUCTION SYSTEM AND METHOD

BACKGROUND

Mobile communication devices including smart phones and the like have become widespread and highly popular. Their ubiquity has lead to major problems as such mobile devices are all-too-often being used at inappropriate times such as when driving. This has created a desire by parents, guardians, employers and others to monitor the use of mobile devices and to restrict their use during driving. However, overly restricting use of mobile devices can be impractical, may end up sacrificing the safety and convenience offered by such devices, and may lead to active circumvention of such restrictions. A system that supports reduced driving distractions to help keep a driver's attention on the road and away from his mobile device would be useful. Beneficially, such a system would deter use of the mobile device by blocking access to some or all of its functionality.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A processor-implemented system is provided for controlling the functionality of a mobile device of a driver (also referred to as a first user) during driving so as to reduce driving distractions related to the mobile device. The invention can automatically enter a driving mode when driving is detected. The driving mode implements an alternate user interface (UI) that limits interactions with the mobile device in accord with predetermined restrictions. The driving mode may automatically screen incoming calls and texts while suppressing potentially-distracting notifications. The system implements a PIN-based mechanism that ensures user compliance while enabling an "opt-out" feature ("I'm Not Driving" button) that is usable under controlled circumstances. In addition to automatic entry the driving mode may be entered voluntarily.

Further provided is a computing system comprising a non-transitory computer readable storage medium having encoded thereon instructions that, when executed by one or more processors of the system, cause the system to perform a process. The process includes accessing sensor data of a mobile device, determining based on the sensor data that the mobile device is operating in a moving vehicle, and disabling a functional component of the mobile device based at least on determining that the mobile device is operating in a moving vehicle. An override request is received from a first user via the mobile device and the functional component is enabled responsive to the override request.

Further provided is non-transitory computer-readable media tangibly embodying a program of instructions executable by at least one processor-enabled computing system to implement a method, the at least one computing system being capable of interfacing with a communications network. The method includes accessing sensor data of a mobile device, determining based on the sensor data that the mobile device is operating in a moving vehicle, and disabling a functional component of the mobile device based at least on determining that the mobile device is operating in a moving vehicle. An override request is received from a first user via the mobile device and the functional component is enabled responsive to the override request.

BRIEF DESCRIPTION OF THE DRAWING(S)

A more detailed understanding may be had from the following detailed description when taken in conjunction with the accompanying drawings. However, the figures in the drawings and the detailed description are examples only and are not to be considered limiting as other implementations are possible. In the figures like reference numerals indicate like elements, and wherein:

FIG. 1 presents a diagram of a network system that is suitable for practicing a distraction reduction system.

DETAILED DESCRIPTION OF ILLUSTRATIVE EMBODIMENT(S)

The described illustrative embodiments are not limiting. A person skilled in the art will appreciate that many other embodiments are possible without deviating from the described basic concepts. The terms "a" and "an" as used herein do not denote a limitation of quantity but rather denote the presence of at least one of the referenced items.

A distraction reduction system 20 is provided that automatically runs on a mobile device to reduce distractions caused by the mobile device while driving. The distraction reduction system 20 described herein may be implemented as a processor-controlled system running in accord with a computer program. That program may be implemented in software or in firmware, and a copy of the program is preferably stored in one or more non-transitory computer-readable storage devices.

Figure 1:
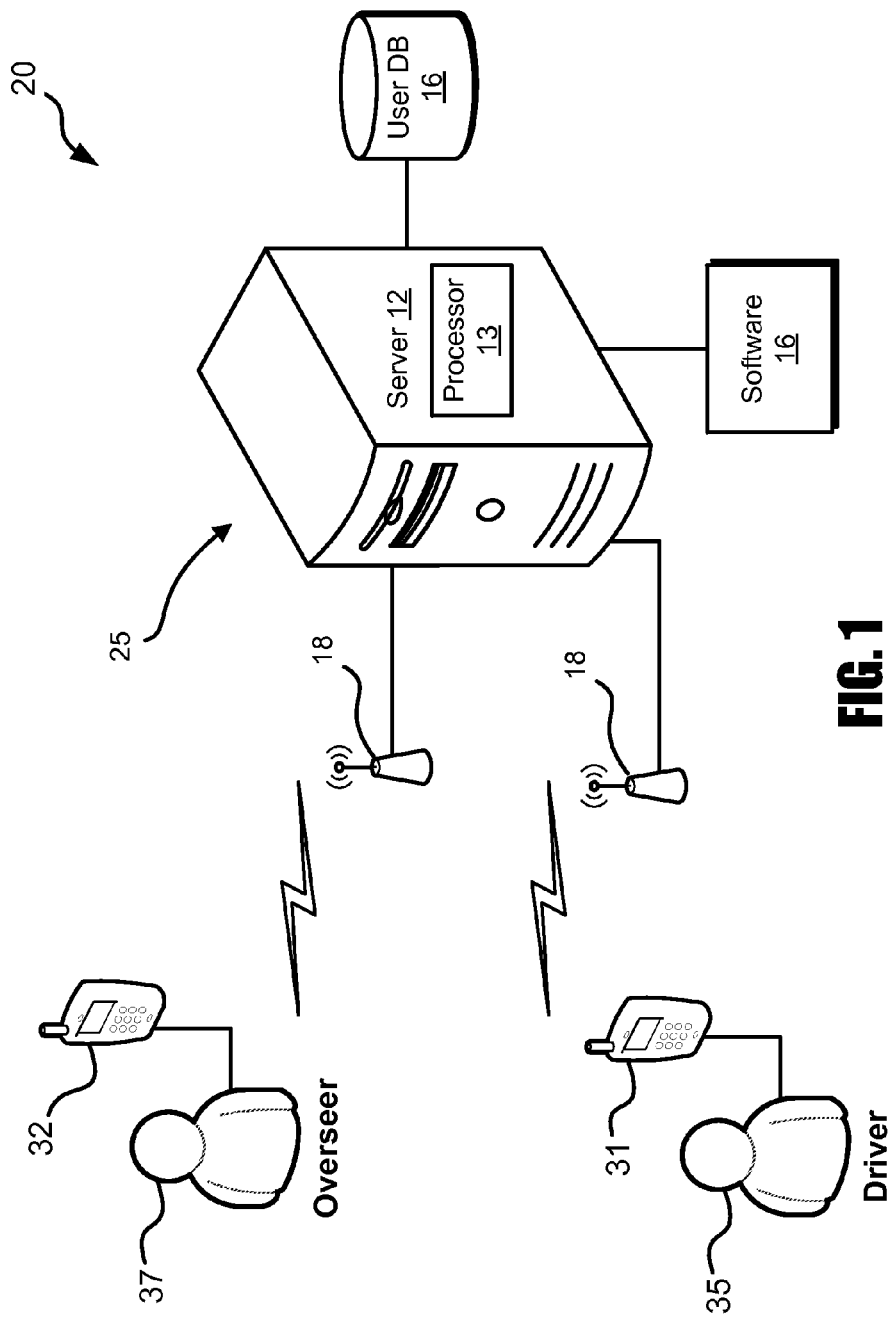

The distraction reduction system 20 is preferably configured as a top-layer mobile device application running on a processor-based mobile device that provides communications over a communication carrier's network. FIG. 1 illustrates a prototypical infrastructure suitable for implementing the distraction reduction system 20. As shown, a network carrier 25 operates a processor controlled server 12 having features such as a carrier database 16 and a network communication system 18. That communication system 18 should be understood as including a structure of cellular towers, internet links, phone lines, microwave towers, and other communication facilities. The server 12 runs in accord with internal operating software 16 which supports the network carrier 25 to perform its tasks of telephone communications, text messaging and data transferring.

Still referring to FIG. 1, the network carrier 25 is in communication with a mobile device 31 of a driver 35 and in communication with a mobile device 32 of an overseer 37 (also referred to herein as a second user). The mobile device 31 is running in accord with the distraction reduction system 20 while the mobile device 32 is not necessarily running in accord with the distraction reduction system 20. In practice, the driver 35 may be a child or an employee of the overseer 37. The network carrier 25 provides data, voice, picture and other services to the driver 35 and possibly to the overseer 37. The distraction reduction system 20 is installed as an app on the mobile device 31. During installation the overseer 37 inputs a controlling PIN (personal identification number) into the distraction reduction system 20. Thus installation is a significant step in the distraction reduction system 20 as that PIN helps ensure driver compliance.

Figure 2:
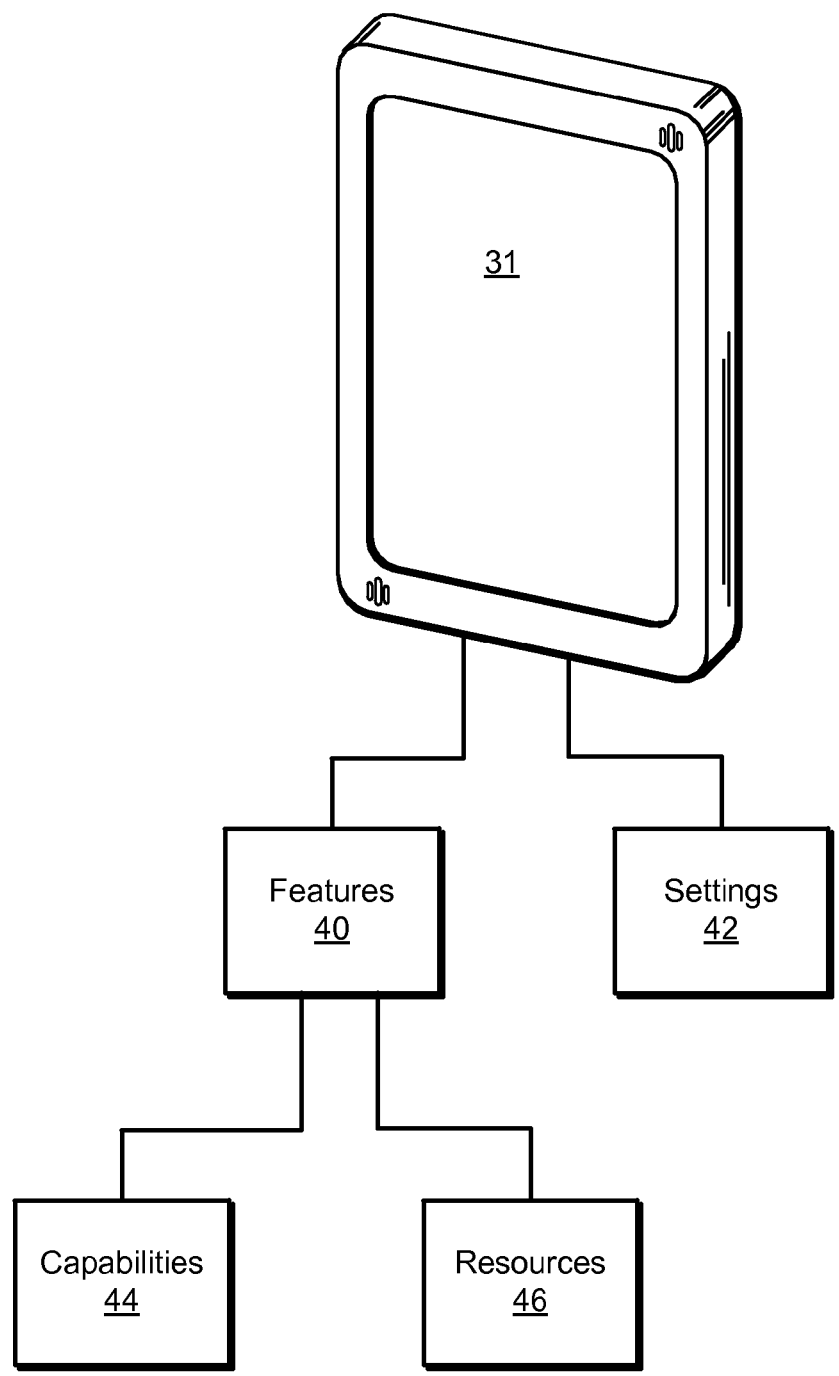
FIG. 2 is a depiction of the controls and settings of a mobile device 31 shown in FIG. 1.

FIG. 2 illustrates the functional components of the mobile device 31. As is described in more detail elsewhere the distraction reduction system 20 is implemented as a top-level application that automatically modifies some of the functional components illustrated in FIG. 2 during driving to improve safety. As shown, the mobile device 31 has a number of features 40 and setting 42. Those features would typically be provided by the mobile device's OEM (original equipment manufacturer), the operator of the network carrier 25 (such as by firmware control), or added to the mobile device as an app (application). The settings 42 control the features 40, for example, a volume control setting. The features 40 and the resources 46 of the mobile device 31 provide the mobile device 31 with capabilities 44 such telephone communications, email capabilities, and alarms. The distraction reduction system 20 automatically adjusts the settings 42 to control the features 40 to control the resources 46 to limit the capabilities 44 of the mobile device 31.

Figure 5A:
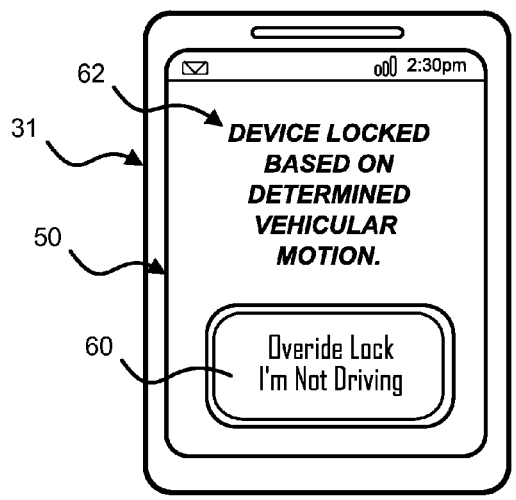
FIG. 5A-5D are show exemplary screen displays of the mobile device 31 pursuant to described methods.

Still referring to FIG. 2, when the distraction reduction system 20 determines that the mobile device 31 is in a moving vehicle the distraction reduction system 20 automatically switches to an alternate user interface that includes an opt-out feature which is shown in FIG. 5A as an "I'm Not Driving" button 60 on a display 50 of the mobile device 31. The operation of that opt-out feature is described in more detail subsequently. That alternate user interface can also include a message screen that indicates that at least one function is disabled. For example the display 50 further includes explanatory text 62 indicating "Device locked based on determined vehicular motion."

Figure 3:
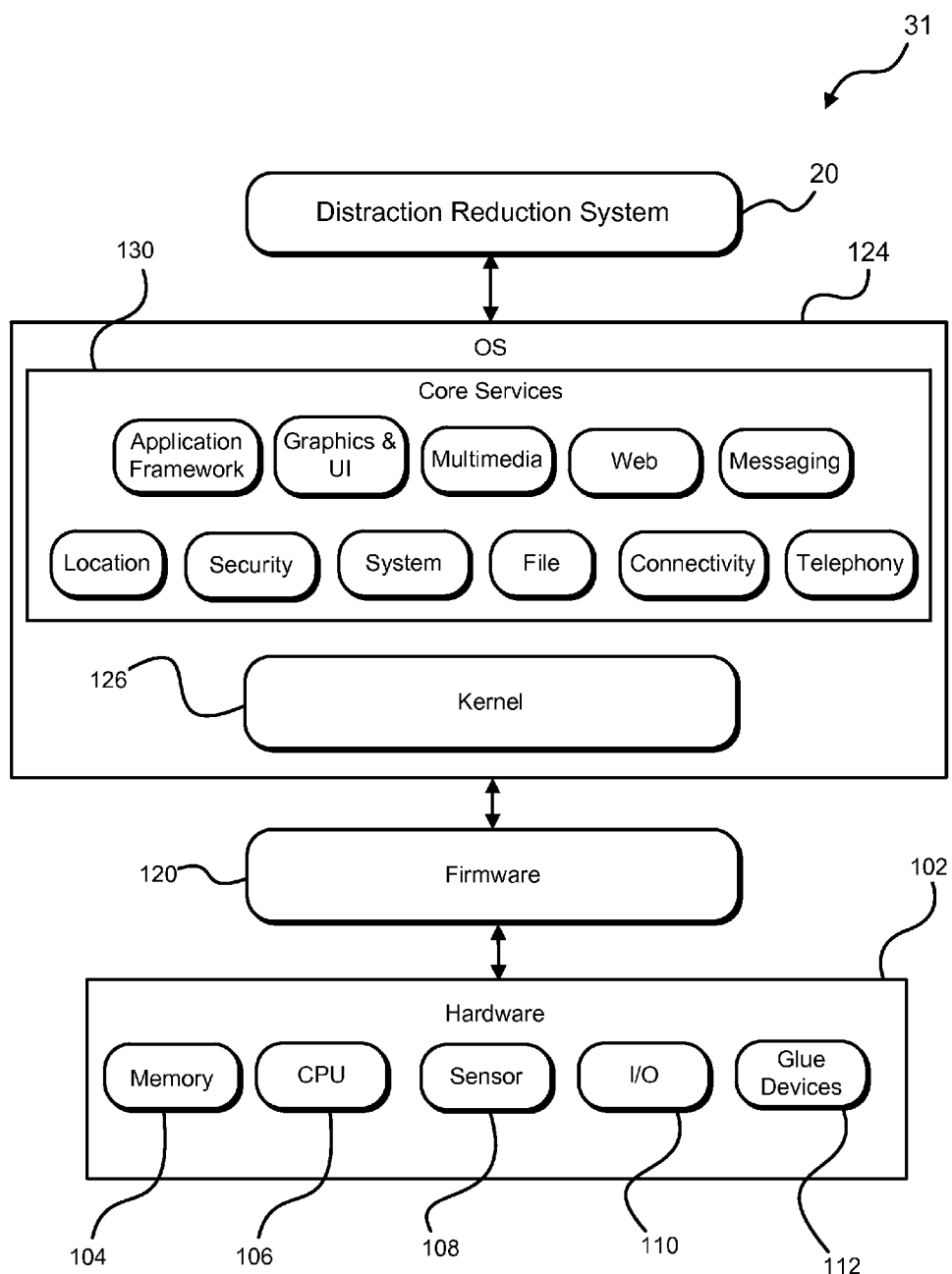
FIG. 3 is a hierarchical view of the mobile device 31 shown in FIGS. 1 and 2.

FIG. 3 illustrates in abstract the hierarchical functioning of the mobile device 31 from its basic hardware to the top level distraction reduction system 20 app. At the lowest abstraction level of the mobile device 31 is a collection of basic hardware 102 devices. Such hardware 102 includes memory 104, a central processor unit ("CPU") 106, numerous sensors 108, including a GPS system and a motion sensor such as an accelerometer, along with their support electronics, input/output ("I/O") 110 support (specifically including display screens and drivers, audio drivers and outputs, RF transceivers, etc.), and glue devices 112 as required to change voltage levels or signal levels and to perform other interfacing as required for proper hardware 102 functionally.

Turning specifically to the memory 104, that memory includes non-transitory memory that retains both the operating system and the distraction reduction system 20 app of the mobile device. The memory 104 may also include temporary RAM as required to operate the mobile device 31.

The next level of abstract hierarchical progression is firmware 120, if required. Firmware 120 is useful for enabling upgrading of the mobile device 31 by storing in a non-volatile memory various settings such as model numbers, version numbers, and controlling bits which establish a set of functions and which may limit or restrict the capabilities of the mobile device 31. In practice, the network carrier 25 will often set the firmware 120 to work with the communication system 18 and with the capabilities desired by the network carrier 25.

Moving up the abstract hierarchical progression, above the firmware 120 is an operating system 124. The operating system 124 provides a set of core software programs that manage the hardware 102 and firmware 120 and that implement common services which support one or more applications, specifically including the distraction reduction system 20 app.

The operating system 124 includes a low-level "kernel" routine 126 that handles basic software integration to the firmware 120 and hardware 102 and that implements underlying functions. Over the kernel 126 is a set of core services 130 that while still basic may change from time to time or from family device to family device. The core services 130 are software functions that support the on-board services of the mobile device 31. The core services 130 may include software routines that support and enable the application framework such as graphics, web support, messaging, location finding (GPS), system security, connectivity, telephony and a file system. Importantly, the application framework should be understood as including apps.

Overlaying the operating system 124 is the distraction reduction system 20 app. The distraction reduction system 20 app may be installed after being downloaded from the network carrier 25, supplied by a third party provider, or input by the overseer 37. When installed, the overseer 37 inputs a PIN which prevents removal of the distraction reduction system 20 app. Once installed, the overseer 37 can set up the distraction reduction system 20 to implement one or more of its features.

The purpose of the distraction reduction system 20 is to improve safety by reducing distractions while driving. To do that the distraction reduction system 20 must first determine if the driver 35 is actually driving. This is performed using sensor 108 information such as GPS locations over time and/or motion sensor information which indicates driving motion. The CPU processor 106 acts under the commands of the software code of the distraction reduction system 20 to use senor data to determine that the mobile device 31 is operating in a moving vehicle based on the location data and/or sensor data, specifically including acceleration data from an accelerometer.

Once the mobile device 31 is determined to be in a moving vehicle, the distraction reduction system 20 causes the CPU processor 106 to adjust one or more of the settings 42 to disable or modify at least one of the features 40 of the mobile device 31 (reference FIG. 2). As described in more detail subsequently the distraction reduction system 20 (reference FIG. 5A) then optionally enables an opt-out feature such as the "I'm Not Driving" button 60 (reference FIG. 5A). However, the overseer 37 when setting up the distraction reduction system 20 can set up the distraction reduction system 20 to not provide the op-out feature. In addition, the overseer 37 can limit the use of the op-out feature as described below. Once the op-out feature is used the CPU processor 106 changes the setting 42 to enable or change at least one of the features 40 of the mobile device 31.

In some embodiments the distraction reduction system 20 determines whether the mobile device 31 is in a moving vehicle by determining the location of the mobile device 31 relative to road map data that is stored in the memory 104. In that case the at least one functional component becomes responsive to the location of the mobile device 31 relative to the road map data in the memory 104. Another approach to determining whether the mobile device 31 is in a moving vehicle is to use trajectory information from the sensor 108 relative to trajectory data stored in the memory 104. That trajectory data may be relative to stored road map data. In that case the at least one functional component becomes responsive to the trajectory of the mobile device 31.

Another approach to determining whether the mobile device 31 is in a moving vehicle is by using driving schedule data related to the driver 35 which is stored in the memory 104. In that case, enabling the at least one functional component is responsive to the driving schedule data.

Yet another approach to determining whether the mobile device 31 is in a moving vehicle is by using location data derived from cell tower triangulation. In that case enabling the at least one functional component is responsive to information from cell tower triangulation. Such triangulation can be cell or tower based.

A given mobile device 31 may have a number of features that are suitable for disablement to improve driving safety. For example, a mobile device 31 may have features such as voice calling, electronic text messaging, audio alerts and alarms, visual alerts and alarms, a vibration mode, and application extensions that may be totally or partially disabled. In particular, during driving the communication capability will usually be disabled. However, in practice the memory 104 may include a list of phone numbers or addresses such as a parent or emergency service or services that can selectively remain enabled even when driving.

As previously noted the distraction reduction system 20 is used to improve safety by reducing distractions while driving or performing other potentially hazardous tasks. Such a system is useless if not used. To ensure use the overseer 37 will ensure that the distraction reduction system 20 is installed on the mobile device 31. This may be performed by providing the mobile device 31 to the driver 35 with the distraction reduction system 20 already installed, by installing, or by coercing the driver 35 to install the distraction reduction system 20.

Once installed the distraction reduction system 20 must not be uninstalled, overridden, or modified, and it must be used. The distraction reduction system 20 includes features which ensure it is not removed, which forces compliance, and which allows the overseer 37 to customize the distraction reduction system 20 to fit the particular driver 35. To such ends the distraction reduction system 20 includes an "anti-tamper" functionality that prevents the distraction reduction system 20 from being uninstalled, overridden or modified without the permission of the overseer 37. The "anti-tamper" functionality includes both registering the distraction reduction system 20 app as having device administrator privileges and the use of a PIN. Once registered, to remove or modify the distraction reduction system 20 the device administrator privileges must first be removed and that removal requires entry of the PIN.

The overseer-created PIN also locks down relevant settings within the distraction reduction system 20. For example, the distraction reduction system 20 can be customized to allow the use of Bluetooth™ hands free devices that circumvent the ban on calls, to automatically engage when driving is detected, to allow the selection of particular apps that can be used while driving, and to allow the selection of phone numbers or address book contacts corresponding to calls which should not be blocked while driving. The PIN is required to make changes to any or all of these settings as well as turning off the PIN, changing the PIN, or changing which settings are protected by the PIN.

The distraction reduction system 20 implements an overriding opt-out feature that takes the form of an "I'm Not Driving" button 60 (see FIG. 5A) which is displayed when the distraction reduction system 20 is in the driving mode.

The "I'm Not Driving" button 60 opts-out of the controls applied to the mobile device 31 by the distraction reduction system 20 and returns the mobile device 31 to its non-driving mode. Alternatively, the "I'm Not Driving" button 60 may simply modify the driving mode to enable selected features.

The "I'm Not Driving" button 60 exists primarily because reliably distinguishing between when the driver 35 is driving a car and when the driver 35 is a passenger in a vehicle is difficult. Other false positives also exist such as the driver 35 riding on a bus or a train or some other alternate form of transportation. In such cases it is reasonable that the driver 35 does not need the enhanced safety provided by the distraction reduction system 20 such as when driving, and may want normal, unrestricted access to the full functionality of the mobile device 31.

It should also be understood that the driver 35 may on occasion need unrestricted access to their phone even while driving, such as when being followed or to contact emergency services. Thus the distraction reduction system 20 can be configured during set-up to allow use of the "I'm Not Driving" button 60 even when driving. The distraction reduction system 20 alternatively can be configured to not include the "I'm Not Driving" button 60 at all. This provides protection to the driver 35 while driving at the expense of not allowing unrestricted mobile device 31 access when being a passenger in a moving vehicle.

Figure 5B:
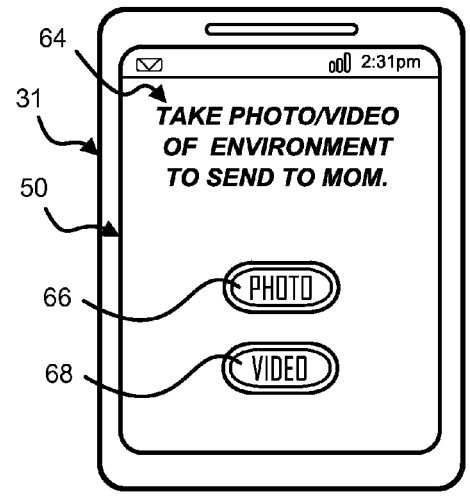
Figure 5C:
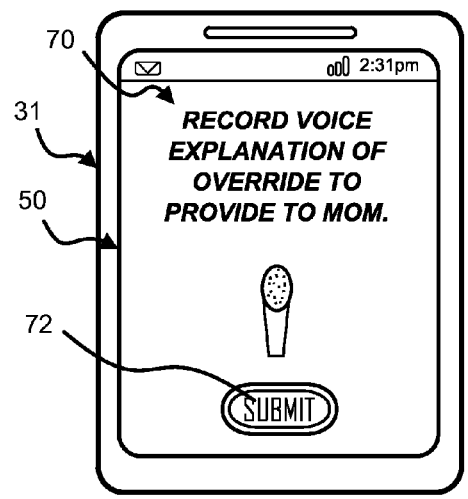

Another alternative opt-out approach is a "trust but verify" scheme which allows use of the "I'm Not Driving" button 60 but sends a time-stamped text to the overseer 37 each time it is used. This enables the overseer 37 to obtain a sense of when and how often the "I'm Not Driving" button 60 is used and whether an investigation into its use is appropriate. Support for the "trust but verify" scheme optionally may include providing the overseer 37 with an audit of the use of the "I'm Not Driving" button 60. For example, a weekly log in which the overseer 37 can review past behavior. The "trust but verify" scheme may optionally require the driver 35 to provide support for use of the "I'm Not Driving" button 60, such as a contemporaneous photo, video, and/or auditory recording of their environment to provide context for the audit. FIG. 5B shows the display 50 of the mobile device 31 with exemplary explanatory text 64 prompting actuation of "Photo" and "Video" buttons 66, 68 for contemporaneous photo or video recording. FIG. 5C shows the display 50 of the mobile device 31 with exemplary explanatory text 70 prompting recording of a voice explanation of an override and submission to an overseer 37 via button 72, which recording can also capture environmental sound. The distraction reduction system 20 can also capture GPS and trajectory data to provide further audit information to the overseer 37.

Figure 5D:
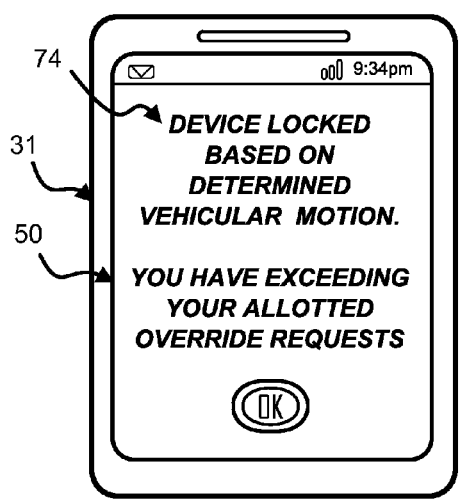

Another opt-out approach is to provide a throttling number of uses of the "I'm Not Driving" button 60. After "N" uses of the "I'm Not Driving" button 60 the distraction reduction system 20 removes the "I'm Not Driving" button 60 until reset either by the overseer 37 or automatically over time. FIG. 5D shows the display 50 of the mobile device 31 with exemplary explanatory text 74 indicating that the "device [is] locked based on determined vehicular motion", and that the user has exceeded an allotted threshold of override requests.

The distraction reduction system 20 can be configured to require that the driver 35 provide the overseer 37 with an explanation for the use of the "I'm Not Driving" button 60. Reference for example FIG. 5C. The distraction reduction system 20 also can be configured to record what the driver 35 does with the mobile device 31 after use of the "I'm Not Driving" button 60 and for how long. The distraction reduction system 20 optionally can attempt to capture evidence of whether or not the driver 35 is distracted, for example, by sensing keystrokes and texting patterns which likely would be different for someone driving than when sitting on a bus or as a passenger in a car.

The distraction reduction system 20 also makes use of sensor data which may be combined with other data sources (e.g. a database of road geometries or public transit routes) to provide "smart" use of the "I'm Not Driving" button 60. For example, tracking the output of the GPS sensor against the database to determine if the mobile device 31 is on a specific road or on a bus line (in which case the "I'm Not Driving" button 60 might be automatically activated), the time of day or day of week the travel is detected, what other signals are detected (e.g. a Bluetooth or WiFi signal emanating from a car, signals emanating from other mobile phones), and clues from sensors of the mobile device 31 such as auditory (mic), visual (camera), tactile (touch screen), orientation (gyroscope), and acceleration (accelerometer). In use, the distraction reduction system 20 might recognize that the mobile device 31 is moving along a daily commute route in which the overseer 37 is confident that the driver 35 will be driving and therefore should have no access, or restricted access, to the "I'm Not Driving" button 60.

Figure 4:
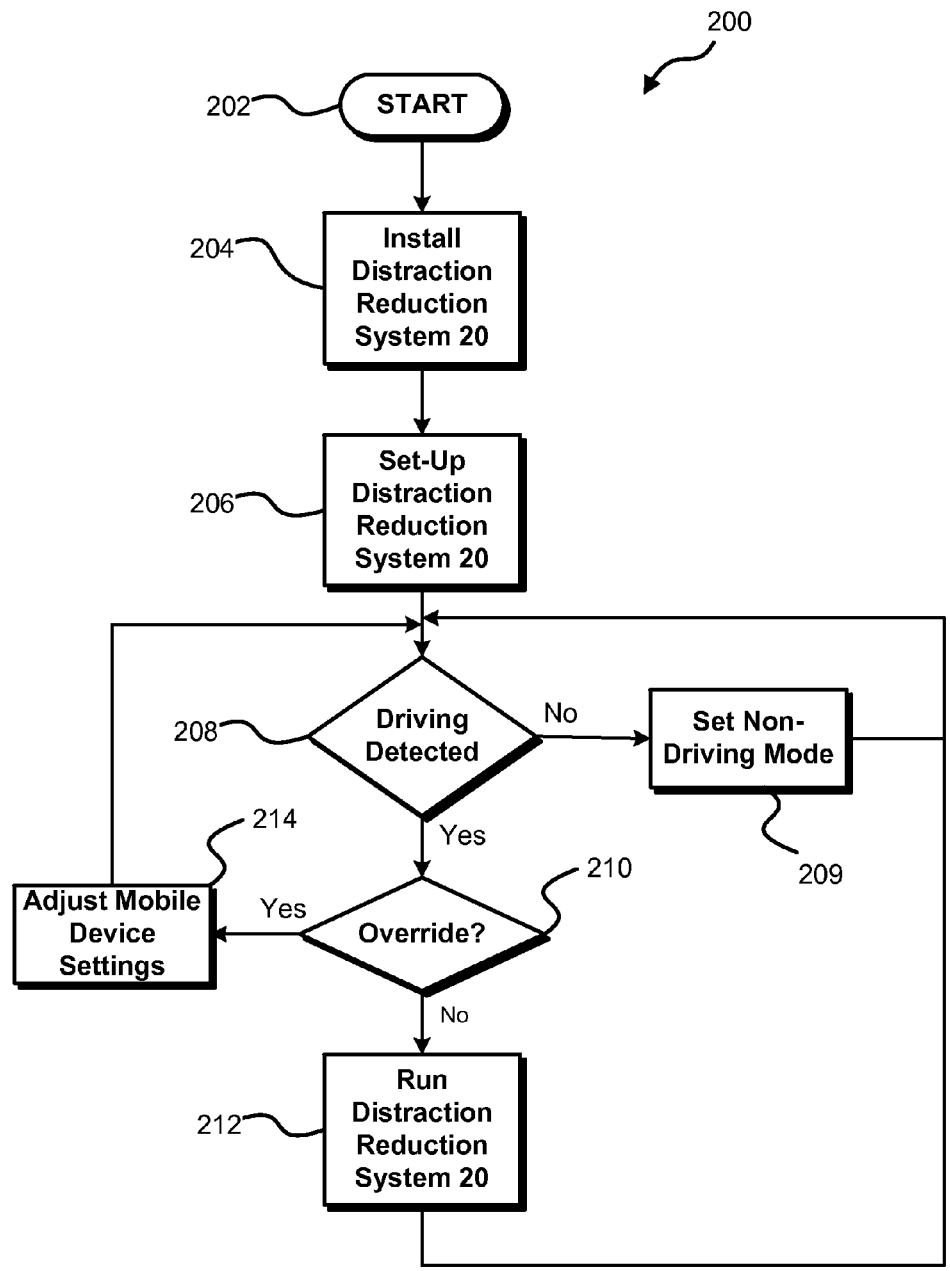
FIG. 4 is a flow diagram of the operation of the distraction reduction system of FIG. 1.

The foregoing descriptions support the various operations of the distraction reduction system 20. FIG. 4 provides a functional block diagram of the key operations in method format. The method 200 starts, step 202 by installing the distraction reduction system 20 on the mobile device 31, step 204. As noted above, step 204 includes not only obtaining and loading the distraction reduction system 20 onto the mobile device 31 as a top level application, but also entry of a PIN number by the overseer 37 that restricts removal and modifications of the distraction reduction system 20.

Following step 204, the distraction reduction system 20 proceeds with set-up, step 206. That set up beneficially includes the overseer 37 specifying criteria for the "I'm not Driving" button 60 as well as the settings 42 that will be modified to control capabilities 44 of the mobile device 31. Step 206 may also include entry of phone numbers that should not be blocked even when driving, information for the memory 104 such as map information, and other data as described above. Step 206 may be used by the overseer 37 to control and fine tune the method or methods used to determine when the mobile device 31 is in a moving vehicle.

Following step 206 the distraction reduction system 20 begins detecting whether the driver 35 is driving, step 208. As noted above such a determination is not definitive as the driver 35 may simply be a passenger. If driving is not detected the method 200 ensures that the settings 42 for the non-driving mode are set, step 209, and a loop is run until driving is detected in step 208.

Once driving is detected the method 200 determines whether the detected driving should be overridden, step 210. Again, an override is appropriate when the driver 35 is a passenger or under other prescribed conditions. The override criteria were specified in step 206. If the distraction reduction system 20 is not to be overridden, the distraction reduction system 20 is run, step 212, settings are adjusted for a driving mode, and a loop is made back to step 208. That way, when driving ends the distraction reduction system 20 returns the mobile device 31 to its non-driving mode and waits until driving is once more detected.

However, if in step 210 the decision is made to override the driving mode the method 200 proceeds to step 214 in which the settings of the mobile device 31 are adjusted to an opt-out configuration. That configuration was set up in step 206.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

What is claimed is:

1. A method comprising:
   accessing location data and/or sensor data of a mobile device corresponding to a first user;
   determining by a processor that the mobile device is operating in a moving vehicle based on the location data and/or the sensor data;
   disabling at least one function of the mobile device based at least on determining that the mobile device is operating in a moving vehicle;
   receiving an override request from a first user via the mobile device;
   generating by the mobile device responsive to the override request a user-actuatable data recording interface on the mobile device configured to enable capturing a photo and/or a video and/or an audio recording;
   providing instructions to the first user via the mobile device to capture the photo and/or the video and/or the audio recording responsive to receiving the override request;
   capturing by the mobile device the photo and/or the video and/or the audio recording responsive to user actuation of the data recording interface on the mobile device;
   transmitting the photo and/or the video and/or the audio recording captured via the user actuation of the data recording interface on the mobile device to a second user;
   enabling the at least one function responsive to the override request and the user actuation of the data recording interface.

2. The method of claim 1, further comprising:
   determining a location and/or a path of the mobile device; and
   transmitting the location and/or the path of the mobile device to the second user.

3. The method of claim 1, further comprising:
   querying the first user for an explanation regarding the override request;
   receiving the explanation from the first user via the mobile device; and
   transmitting the explanation to the second user from the mobile device.

4. The method of claim 1, further comprising enabling a message screen on the mobile device indicating that the at least one function is disabled.

5. The method of claim 4, further comprising enabling a screen button and receiving the override request via the screen button.

6. The method of claim 1, wherein the location data and/or the sensor data comprises location data from a global positioning system ("GPS") sensor.

7. The method of claim 1, wherein the location data and/or the sensor data comprises location data derived from handset-based or network-based cell tower triangulation.

8. The method of claim 1, wherein the location data and/or the sensor data comprises acceleration data from an accelerometer on the mobile device.

9. The method of claim 1, wherein the at least one function of the mobile device comprises a feature and/or setting and/or capability and/or resource of the mobile device.

10. The method of claim 1, the mobile device comprising a device control application, wherein disabling the at least one function of the mobile device is performed by the device control application and the disabling comprises limiting voice calling and/or electronic text messaging and/or application execution on the mobile device.

11. The method of claim 1, the mobile device comprising a device control application, wherein disabling the at least one function of the of the mobile device is performed by the device control application and the disabling comprises partially disabling or completely disabling the at least one function.

12. The method of claim 1, the mobile device comprising a device control application, wherein disabling the at least one function of the mobile device is performed by the device control application and the disabling comprises disallowing communication except to at least one particular predetermined party.

13. The method of claim 1, the user-actuatable data recording interface comprising a photo recording interface and/or a video recording interface.

14. A method comprising:
accessing location data and/or sensor data of a mobile device corresponding to a first user;
determining that the mobile device is operating in a moving vehicle a plurality of times during a particular time period;
disabling at least one function of the mobile device a plurality of times based at least on determining that the mobile device is operating in a moving vehicle.
receiving a plurality of override requests from the first user to enable the at least one function during the particular time period;
determining if a first override request meets or exceeds a particular threshold number of override requests;
enabling the at least one function responsive to the first override request not meeting or exceeding the particular threshold number;
determining if a second override request meets or exceeds the particular threshold number of override requests; and
disallowing subsequent override requests after the second override request responsive to the second override request meeting or exceeding the particular threshold number.

15. The method of claim 14, further comprising transmitting a notification to a second user responsive to receiving the first override request.

16. The method of claim 14, further comprising:
providing a notification of an override status to a second user corresponding to another device;
receiving from the second user via the other device a reset command; and
allowing the subsequent override requests enabling the at least one function responsive to the reset command received from the other device corresponding to the second user.

17. A method comprising:
accessing location data and/or sensor data of a mobile device;
determining by a processor that the mobile device is operating in a moving vehicle based on the location data and/or the sensor data;
disabling at least one function of the mobile device based at least on determining that the mobile device is operating in a moving vehicle;
receiving an override request from a first user via the mobile device;
enabling the at least one function responsive to the override request;
after enabling the mobile device, recording user inputs to the mobile device comprising keystrokes and/or texting patterns;
determining that the first user is driving based on the keystrokes and/or the texting patterns to the mobile device; and
re-disabling the at least one function responsive to determining that the first user is driving.

18. The method of claim 17, wherein recording the keystrokes and/or the texting patterns comprises logging text inputs to the mobile device, the method further comprising determining that the first user is driving based on the logged text inputs.

19. A method comprising:
accessing location data and/or sensor data of a mobile device;
determining by a processor that the mobile device is operating in a moving vehicle based on the location data and/or the sensor data;
disabling at least one function of the mobile device based at least on determining that the mobile device is operating in a moving vehicle;
receiving an override request from a first user via the mobile device;
receiving driving schedule data corresponding to the first user;
determining whether the first user is driving based on the driving schedule data and a time that the override is requested;
enabling the at least one function responsive to the override request and the driving schedule data relative to the time that the override is requested.

* * * * *